Patented Mar. 10, 1925.

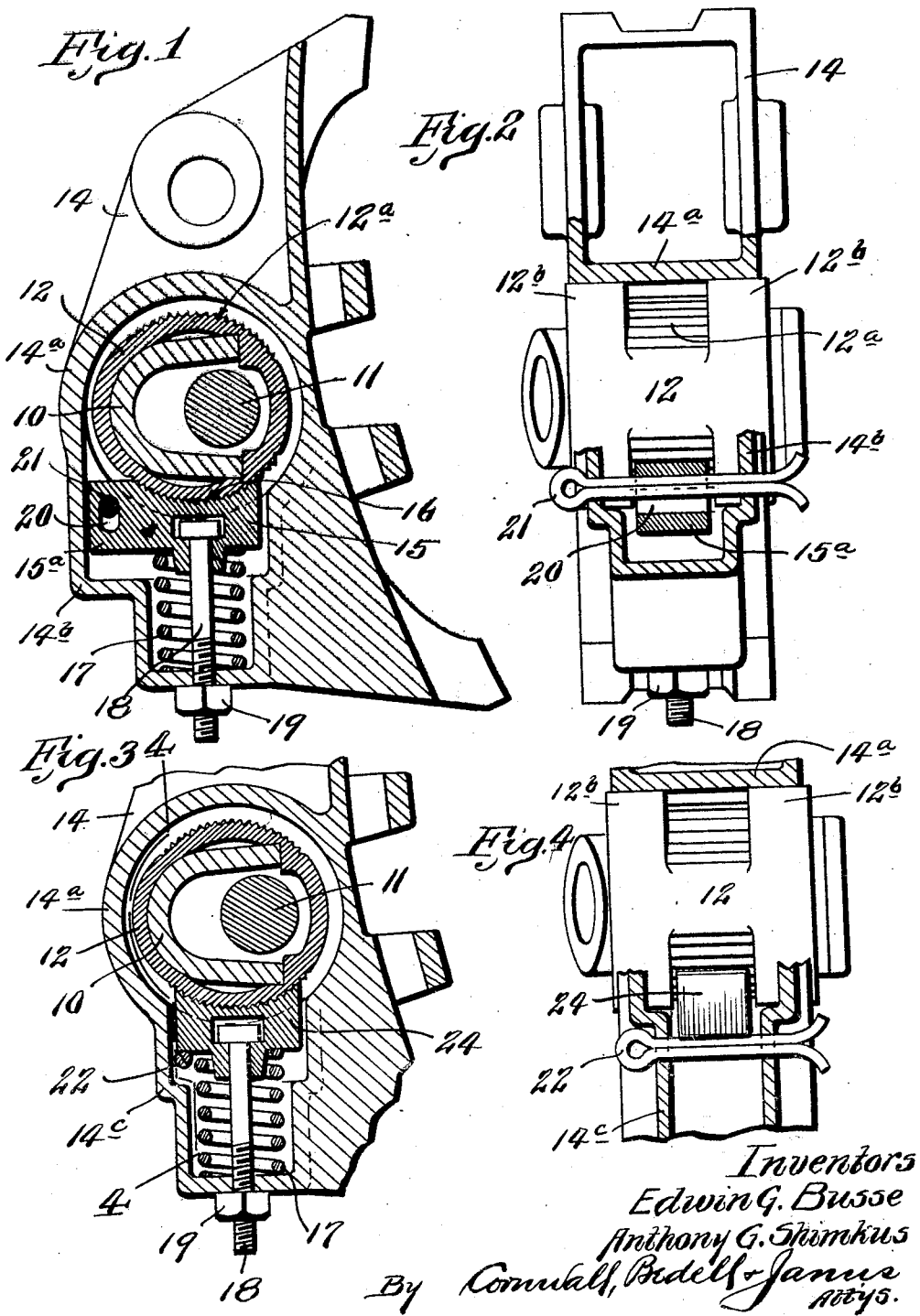

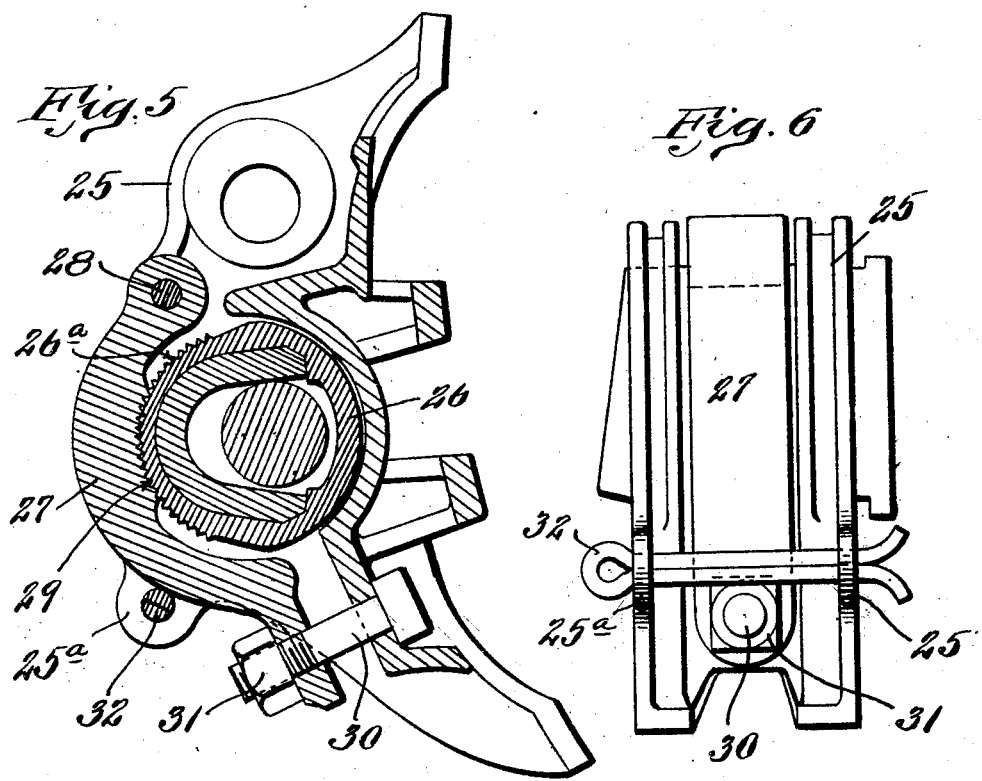
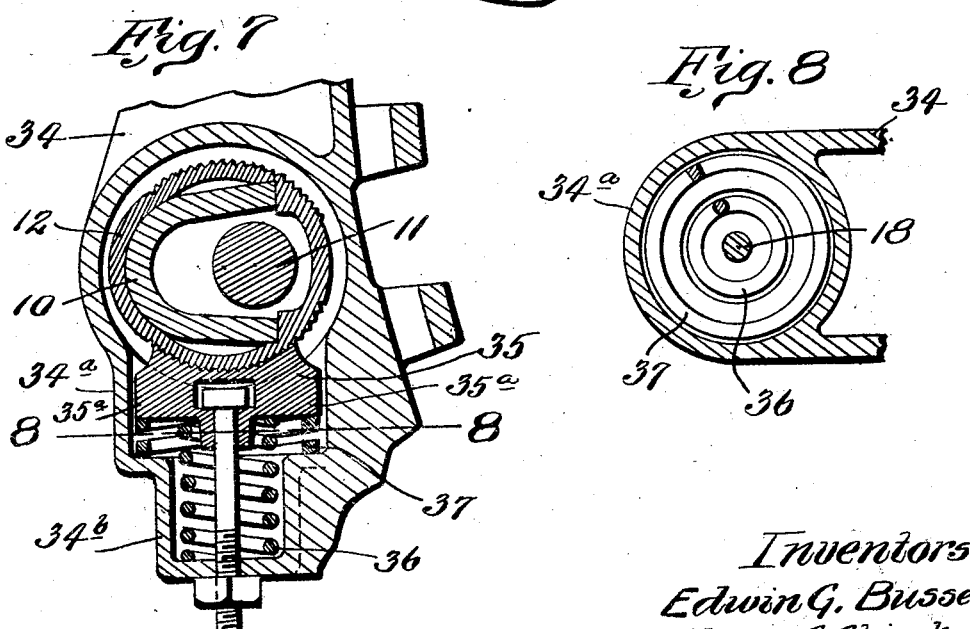

1,529,400

UNITED STATES PATENT OFFICE.

EDWIN G. BUSSE AND ANTHONY G. SHIMKUS, OF CHICAGO, ILLINOIS, ASSIGNORS TO CHICAGO RAILWAY EQUIPMENT COMPANY, OF CHICAGO, ILLINOIS, A CORPORATION OF ILLINOIS.

LOCKING MEANS FOR ADJUSTABLE BRAKE HEADS.

Application filed July 3, 1924. Serial No. 723,898.

*To all whom it may concern:*

Be it known that we, EDWIN G. BUSSE and ANTHONY G. SHIMKUS, citizens of the United States, residing at Chicago, Illinois, have invented a certain new and useful Improvement in Locking Means for Adjustable Brake Heads, of which the following is a specification such as will enable others skilled in the art to which it appertains, to make and use the same.

This invention relates to new and useful improvements in brake gear construction and the objects of the invention are to provide a safety device for preventing the accidental disengagement or displacement of the gripping block or pawl of an automatically adjustable brake head, thereby insuring a positive interlock between the brake head and the brake beam under all conditions.

Further objects of the invention are to provide an interengaging member adapted to move into engaging or operative position and hold the brake head against lateral movement on the brake beam, said interengaging member being designed to be locked against movement into disengaging or inoperative position, thereby eliminating all danger of the brake head becoming displaced in case the spring or the usual device used for bringing said member into engaging position is broken or otherwise disabled.

With these and other objects in view, our invention consists in certain novel features of construction and arrangement of parts, hereinafter more fully described and claimed, and illustrated in the accompanying drawings, in which—

Figure 1 is a vertical cross section through the brake head and parts associated therewith.

Figure 2 is a front elevational view of the brake head, partly in cross section, to more clearly illustrate the method of locking the gripping member.

Figure 3 is a fragmental sectional view of the brake head showing a modified form of locking the gripping member in position.

Figure 4 is a sectional view taken on line 4—4 of Figure 3.

Figure 5 is a vertical cross section through another form of a brake head and showing a modified form of the safety member.

Figure 6 is an elevational view of the brake head shown in Figure 5 looking against the bottom thereof.

Figure 7 is a fragmental cross sectional view of a brake head and showing still another modified form of the safety lock member.

Figure 8 is a horizontal cross section taken on lines 8—8 of Figure 7.

In the construction of automatically adjustable brake heads of the type disclosed in the accompanying drawings, a spring-pressed block or pawl carried by the brake head is used to effect engagement between a sleeve which forms a part of the brake beam and the brake head which carries said block. This block has a corrugated or serrated face which engages the serrated peripheral face or portions of said sleeve and normally serves to maintain the brake head in its adjusted position and permits rotating adjusted movement of said brake head relative to the brake beam but prevents lateral movement or displacement of said brake head. In case of breakage of the spring projecting said block into engagement with a sleeve or of any other device used for this purpose, said block is rendered inoperative and allows the brake head to move into a disengaged position, thereby disabling the brake gear of the car.

It is the purpose of the present invention to provide a safety lock member acting directly upon such a block for maintaining the same in operative or interengaging position independently of its impelling or projecting device, thereby locking said brake head against lateral movement on the brake beam.

Referring by numerals to the accompanying drawings, 10 designates the compression member of a trussed brake beam and 11 the tension member thereof. 12 is a sleeve fixed to each end of the brake beam, said sleeve being provided with serrated or corrugated depressed portions 12ª and annular flanges or shoulders 12ᵇ. A brake head 14 is journaled on said sleeve by having a circular housing or socket member 14ª which is formed integral with said brake head rotatably arranged on the flanged portions 12ᵇ of said sleeve. Brake head 14 is held against lateral movement or displacement by a gripping block 15 which is slidably arranged in a housing 14ᵇ which extends from circular housing 14ª. This block is provided with a concave serrated face 16 which is designed to engage the serrated portions 12ª of sleeve 12 and yieldingly maintain said brake head in its adjusted position.

A coiled spring 17 is arranged in the lower portion of housing 14ᵇ and has its upper end bearing against the underside of block 15 and projects the block in the depressed portion of sleeve 12, thereby preventing lateral movement of the brake relative to said sleeve. The serrated face 16 of block 15 is held in yielding engagement with the serrated portion 12ª by spring 17 and allows rotative movement of the brake head relative to the brake beam for the purpose of maintaining the brake shoe in proper alignment with the wheel.

A bolt 18 has its head seated in a recess in block 15 and the lower threaded end of said bolt extends outwardly through the lower wall of housing 14ᵇ and receives a nut 19, whereby by turning said nut in the proper direction, block 15 may be retracted from its operative position to clear the flanged portions 12ᵇ and allow the insertion or removal of the brake head from the beam.

Heretofore no means were provided for safe-guarding the block 15 and preventing its disengagement from sleeve 12 in case of breakage of spring 17. In order to provide a safe-guard and lock block 15 in its operative position, we form said block with a lateral extension 15ª in which is formed a vertically disposed slot 20 for receiving a cotter pin or bolt 21, the ends of which are seated in the side walls of housing 14ᵇ. Slot 20 is of sufficient length and is so disposed relative to member 21 that when said block 15 is held against downward movement by member 21, a slight upward movement of said block is permitted in order that the concave serrated face 16 of said block may be brought into proper engagement with the serrated portions of sleeve 12. When it is desired to remove the brake head from the brake beam, it is necessary to first remove member 21 so that block 15 may be retracted from its operative position. Thus it will be seen that the brake head is positively locked on the brake beam member 21 without in any manner interfering with the adjusting rotating movement of said brake head as the block 15 has sufficient play in housing 14ᵇ to permit the yielding movement thereof during the adjustment of the brake head, pin 21 acting as a pivot for said block.

In the form shown in Figures 3 and 4, a cotter pin or bolt 22 is seated in the walls of housing 14ᶜ and bears against the underside of a gripping block 24, thereby holding said block against downward movement in case of breakage of spring 17.

In the forms shown in Figures 5 and 6 a brake head 25 is held adjustably in engagement with a sleeve 26 by a member 27 which is pivotally mounted at 28 on said brake head and has a concave serrated face 29 for cooperating with the serrated portion 26ª of sleeve 26. Member 27 is held in engagement with sleeve 26 by a bolt and nut connections 30 and 31, respectively, which engage the opposite end of said member. To prevent the displacement of member 27 in case of breakage of its attaching devices, a cotter pin or bolt 32 is seated in lugs or ears 25ª formed integral with and projecting from brake head 25 and said cotter pin rests against the outer face of member 27 and holds said member in engagement with sleeve 26.

In the forms shown in Figures 7 and 8, a brake head 34 is provided with a housing 34ª in which is slidably mounted a block 35 and a housing 34ᵇ in which is located the usual spring 36. A spring 37 of a comparatively large diameter is seated in housing 34ª and bears against the underside of block 35 which is provided for this purpose with enlarged annular portions 35ª. In this form of construction the gripping block is held at all times in yielding engagement with the sleeve and the auxiliary spring 37 serves as a safety member and will continue to maintain said block in engagement with the sleeve in case spring 36 should break.

We claim:

1. In a brake gear construction, the combination of a brake beam part, a brake head journaled thereon, a gripping block carried by said brake head for effecting automatically adjustable interengagement between said brake beam part and said brake head, means for bringing said gripping block into its operative position, and a safety member seated in said brake head and maintaining said block in its operative position independently of said means.

2. In a brake gear construction, the combination of a brake beam part, having a circumferentially disposed groove, a brake head journaled on said brake beam part, a gripping block carried by said brake head, a device in said brake head for engaging said block and forcing it into position in said groove, thereby interlocking said brake head and said brake beam part, and a safety lock member seated in said brake head and engaging said block for preventing the displacement of said block.

3. The combination of a brake beam part, a brake head journaled thereon, a spring-pressed gripping block yieldingly interengaging said brake beam part and said brake head, and a safety lock member carried by said brake head and engaging said block for permitting movement thereof in one direction and locking it against movement in the opposite or inoperative direction.

4. The combination of a brake beam, a sleeve fixed to one end thereof, a brake head journaled thereon, a block in said brake head for operatively engaging said sleeve, a spring in said brake head and engaging said block for forcing the latter into engagement with said sleeve, and a safety lock member carried by said brake head and engaging said block for arresting the movement thereof in a direction away from said sleeve.

5. The combination of a brake beam, a sleeve carried by one end thereof and having a depressed peripheral portion and laterally projecting annular flanges, a brake head rotatably arranged thereon, a gripping block mounted in said brake head and projecting inwardly into said depressed portion of said sleeve for preventing the lateral movement of the brake head, a device for maintaining said block in its operative position, and a safety lock member removably mounted in said brake head for locking said block against displacement.

6. The combination of a brake beam, a sleeve fixed to one end thereof, a brake head journaled on said sleeve, a block carried by said brake head, means for impelling said block in operative engagement with said sleeve, and a safety member detachably seated in said brake head and engaging said block for holding the latter in operative engagement with said sleeve independently of said means.

7. A brake head having a journal opening adapted to rotatively receive a brake beam part, a gripping pawl carried by said brake head for engaging said beam part and locking the brake head thereon, and an auxiliary locking member in said brake head and engaging and locking said gripping pawl in operative position.

8. A brake head having a journal housing adapted to rotatively receive a brake beam part, a gripping pawl carried by said brake head and adapted to engage said brake beam part to lock said brake head against displacement, and a locking member carried by said brake head and engaging said gripping pawl and locking it in its engaged position.

9. In a brake head construction, a brake head having a journal opening, a gripping pawl carried by said brake head and adapted to extend into said opening for locking said brake head in operative position, and an auxiliary locking member carried by said brake head and engaging said pawl and holding it against movement into inoperative position.

10. In a brake head construction, a brake head, a gripping pawl carried by said brake head and adapted to hold the latter in operative position, and an auxiliary locking member seated in said brake head and bearing against said gripping pawl for locking it in interengaging position.

In testimony whereof we hereunto affix our signatures this 26th day of June, 1924.

EDWIN G. BUSSE.
ANTHONY G. SHIMKUS.